US008229846B1

(12) United States Patent
Sheehy et al.

(10) Patent No.: US 8,229,846 B1
(45) Date of Patent: Jul. 24, 2012

(54) MORTGAGE MATCHING SYSTEM AND METHOD

(75) Inventors: Pat Sheehy, Alexandria, VA (US); Lesley R. Corydon, Fair Haven, NJ (US); David A. Clifton, Westerville, OH (US); George Black, Powell, OH (US); Jay Roth, Scottsdale, AZ (US); Panickos Palettas, Dublin, OH (US); Elaine Wistar, Ambler, PA (US); Julie Shuttlesworth, Jacksonville, FL (US)

(73) Assignee: JPMorgan Chase Bank, N.A., New York, NY (US)

( * ) Notice: Subject to any disclaimer, the term of this patent is extended or adjusted under 35 U.S.C. 154(b) by 514 days.

(21) Appl. No.: 12/503,609

(22) Filed: Jul. 15, 2009

Related U.S. Application Data

(60) Provisional application No. 61/222,178, filed on Jul. 1, 2009.

(51) Int. Cl.
*G06Q 40/00* (2012.01)
(52) U.S. Cl. .......................................... 705/39; 705/35
(58) Field of Classification Search .................... 705/35, 705/39
See application file for complete search history.

(56) References Cited

U.S. PATENT DOCUMENTS

| | | | |
|---|---|---|---|
| 6,424,951 B1 * | 7/2002 | Shurling et al. | 705/14.27 |
| 2006/0253321 A1 * | 11/2006 | Heywood | 705/14 |
| 2007/0027799 A1 * | 2/2007 | Manelis et al. | 705/38 |
| 2009/0048931 A1 * | 2/2009 | Rabson et al. | 705/14 |
| 2009/0125441 A1 * | 5/2009 | Minges et al. | 705/39 |
| 2010/0241545 A1 * | 9/2010 | O'Connor et al. | 705/35 |
| 2010/0312620 A1 * | 12/2010 | White et al. | 705/14.1 |

OTHER PUBLICATIONS

Costanzo, Chris; Relationship Pricing Moves from Nicety to Necessity, American banker, Jun. 26, 2007, vol. 172, Iss. 122.*

* cited by examiner

*Primary Examiner* — Jagdish Patel
(74) *Attorney, Agent, or Firm* — Goodwin Procter LLP

(57) ABSTRACT

A computer-implemented method is disclosed for rewarding mortgage customers of a financial institution. The method includes providing enrollment in a mortgage matching system to eligible mortgage customers, wherein eligibility requirements include the requirement that eligible mortgage customers hold both a mortgage account and a checking account with the financial institution. The customer makes periodic mortgage payments from the checking account to the mortgage account. The method monitors continued compliance with the eligibility requirements and submission of the periodic payments using a monitoring engine. The method further includes determining a reward payment amount to be made to each complying mortgage customer, wherein the reward payment amount is a predetermined percentage of principal and interest paid during a predetermined time period. The calculated reward payment amount is transferred to a pre-selected accessible location for each complying mortgage customer.

31 Claims, 10 Drawing Sheets

MORTGAGE MATCHING SYSTEM AND METHOD

PRIORITY

This application claims priority from provisional application Ser. No. 61/222,178, filed on Jul. 1, 2009.

TECHNICAL FIELD

Embodiments of the invention are related systems and methods for increasing mortgage customer loyalty and in particular to methods for benefiting mortgage customers while simultaneously cross-marketing financial services products.

BACKGROUND OF THE INVENTION

Mortgage financing has evolved over recent years to become increasingly complex and confusing to borrowers with the proliferation of options for loan configuration. For lenders, mortgage financing has become increasingly competitive, with borrowers receiving frequent offers to refinance under ostensibly more favorable terms. Thus, mortgage refinancing occurs frequently and customer loyalty to mortgage financers has been minimal.

In general, financial institutions have devised various mechanisms for promoting customer loyalty. For example, rewards programs have become increasingly associated with credit cards and consumers often favor one credit card over another because of the associated rewards generated with each purchase.

Some card issuers have sought to employ rebates in order to increase use of credit cards. Credit card rebate systems have evolved that provide a rebate tied to general card usage. The entire benefit is enjoyed by consumers who receive a check or credit on their account. However, such credit card rebate systems provide no particular long-term benefits to the cardholder or the card issuer—especially benefits that relate to the card issuer's business. There is limited loyalty-building to encourage cardholders to maintain their existing accounts or open new ones. Moreover, because the rebate is sent directly to the consumer, who can spend it as he/she pleases, there is no mechanism to encourage the consumer to consider other financial products offered by the card issuer or associated financial companies. Nor is there a way to channel funds back to the card issuer to expand business and cross-sell. This is a lost opportunity and significant disadvantage.

Other institutions have suggested credit card systems that transfer a predetermined amount of money to an investment account periodically and bill the cardholder through the credit card account. For example, various systems provide a credit card in combination with a rebate that is also transferred to the investment account.

Often, rewards programs are made more attractive through joint ventures with partners of the card issuers. For example, airlines may provide miles for credit card usage or partnering merchants may provide extra rewards points for purchases Currently, a solution is needed for providing benefits to mortgage customers and potential mortgage customers in order to enhance customer loyalty.

SUMMARY OF THE INVENTION

In one aspect of the invention, a computer-implemented method is provided for rewarding mortgage customers of a financial institution with a reward payment amount. The method comprises providing enrollment in a mortgage matching system to eligible mortgage customers, wherein eligibility requirements include the requirement that eligible mortgage customers hold both a mortgage account and a checking account with the financial institution. The method additionally comprises enabling the customer to make periodic mortgage payments from the checking account to the mortgage account and monitoring for continued compliance with the eligibility requirements and submission of the periodic payments using a monitoring engine implemented by at least one computer processor. The method additionally comprises determining a reward payment amount to be made by the financial institution to each complying mortgage customer using a fulfillment engine implemented by the at least one computer processor, wherein the reward payment amount is a predetermined percentage of principal and interest paid by each complying mortgage customer during a predetermined time period. The method additionally comprises transferring the calculated reward payment amount to a pre-selected location for each complying mortgage customer, wherein the pre-selected location is accessible to the corresponding complying mortgage customer.

In an additional aspect of the invention, a computer-implemented system is provided for rewarding mortgage customers of a financial institution with a reward payment amount. The system comprises an enrollment engine for enrolling eligible mortgage customers in a mortgage matching system, wherein eligibility requirements include the requirement that eligible mortgage customers hold both a mortgage account and a checking account with the financial institution and make periodic payments from the checking account to the mortgage account. The system additionally includes a monitoring engine for monitoring continued compliance with the eligibility requirements and submission of the periodic payments, the monitoring engine implemented by at least one computer processor. The system additionally includes a fulfillment engine implemented by the at least one computer processor, the fulfillment engine comprising: calculation components for determining a reward payment amount to be made by the financial institution to each complying mortgage customer, wherein the reward payment amount is a predetermined percentage of principal and interest paid by each complying mortgage customer during a predetermined time period. The fulfillment engine additionally includes reward transfer components for transferring the calculated reward payment amount to a pre-selected location for each complying mortgage customer, wherein the pre-selected location is accessible to the corresponding complying mortgage customer.

In an additional aspect of the invention, a computer-implemented method is provided for rewarding mortgage customers of a financial institution with a reward payment amount. The method comprises providing enrollment in a mortgage matching system to eligible mortgage customers, wherein eligibility requirements include the requirement that eligible mortgage customers hold both a mortgage account and a checking account with the financial institution. The method further comprises enabling the customer to automatically make periodic mortgage payments from the checking account to the mortgage account and monitoring continued compliance with the eligibility requirements and automatic submission of the periodic payments using a monitoring engine implemented by at least one computer processor. The method additionally includes determining a reward payment amount to be made by the financial institution to each complying mortgage customer using a fulfillment engine implemented by the at least one computer processor, wherein the reward payment amount is a predetermined percentage of principal and interest paid by each complying mortgage customer through the auto-payment system during a predetermined time period. The method additionally includes transferring the calculated reward payment amount to the mortgage account for each complying mortgage customer. Embodiments of the method additionally include processing a refinance application for at least one complying mortgage customer to provide a new mortgage loan for the complying mortgage customer and calculating accrued rewards using a refinancing engine implementing a refinancing processor prior to closing on the refinance application. The method additionally includes reducing a payoff amount by the calculated accrued rewards or crediting the calculated accrued rewards to an account held at the financial institution and enrolling the new mortgage loan in the mortgage matching system.

BRIEF DESCRIPTION OF THE DRAWINGS

The present invention is described in detail below with reference to the attached drawings figures, wherein.

DETAILED DESCRIPTION OF PREFERRED EMBODIMENTS

Embodiments of the present invention are directed to a method and system for financial institutions to reward mortgage customers complying with certain predetermined conditions. Regular payment of a mortgage in combination with maintenance of another account at the financial institution will result in a reward being generated for the customer. In embodiments of the invention, the system enables accelerated payment of the mortgage through contributions made by the financial institution if customers meet the predetermined conditions. Thus, customers meeting the predetermined conditions will be able to more quickly pay off their mortgages through financial institution contribution.

Figure 1:
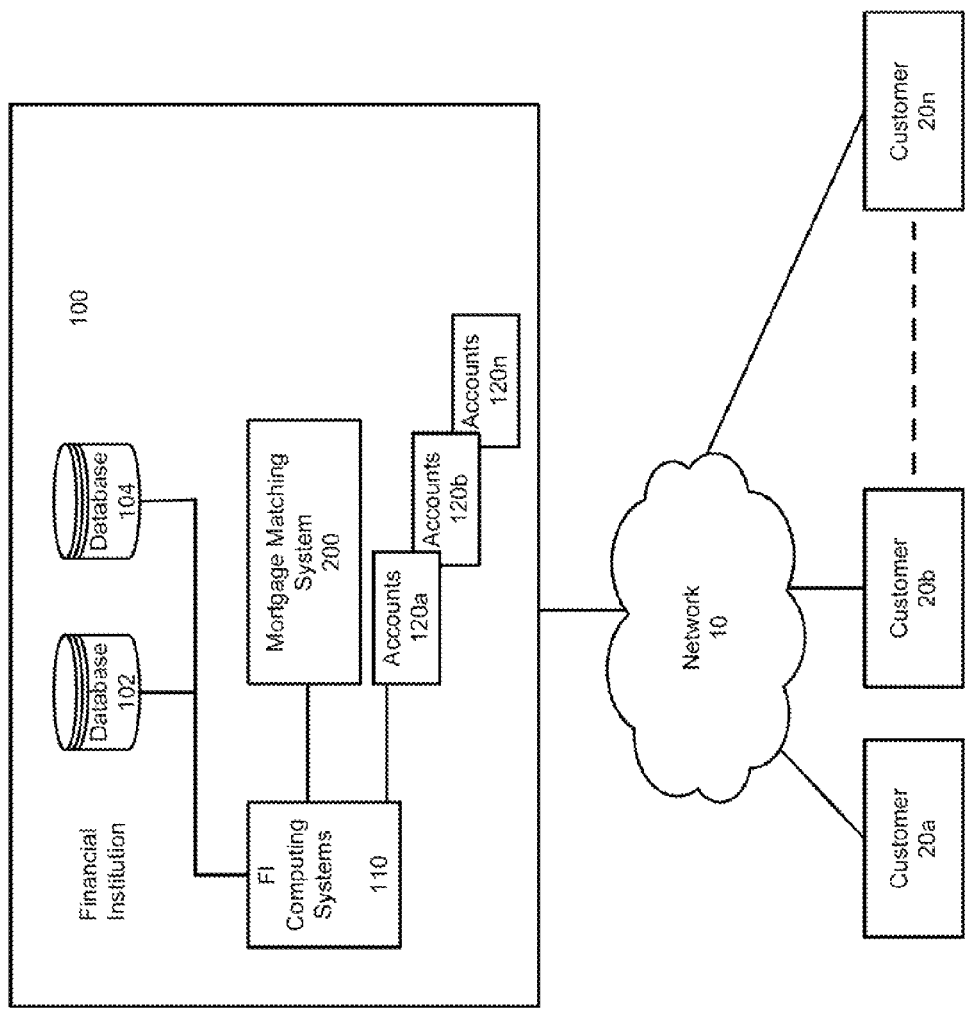
FIG. 1 is a block diagram illustrating an operating environment for mortgage matching system in accordance with an embodiment of the invention.

FIG. 1 is a block diagram illustrating an operating environment for mortgage matching system in accordance with an embodiment of the invention. A financial institution 100 may be connected over a network 10 with multiple customer systems 20a . . . 20n.

The financial institution 100 may have multiple financial institution computing systems 110. Computing systems 110 may be interconnected with a mortgage matching system 200, which will be further described herein, and with databases 102, 104 and with accounts 120a . . . 120n. The accounts 120a . . . 120n may include various types of accounts, such as checking accounts, credit accounts, savings accounts, mortgage accounts, investment accounts, etc. Embodiments of the invention link the mortgage matching system 200 with a mortgage account and a checking account of the financial institution. However, additional embodiments may incorporate other of the aforementioned account types. The above-described components may be connected over a network.

The network 10 as well as networks contained within the financial institution 100 may include a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

Customer systems 20a . . . 20n may be personal computing systems or any other type of system capable of connecting over the network 10 with the financial institution 100.

Figure 2:
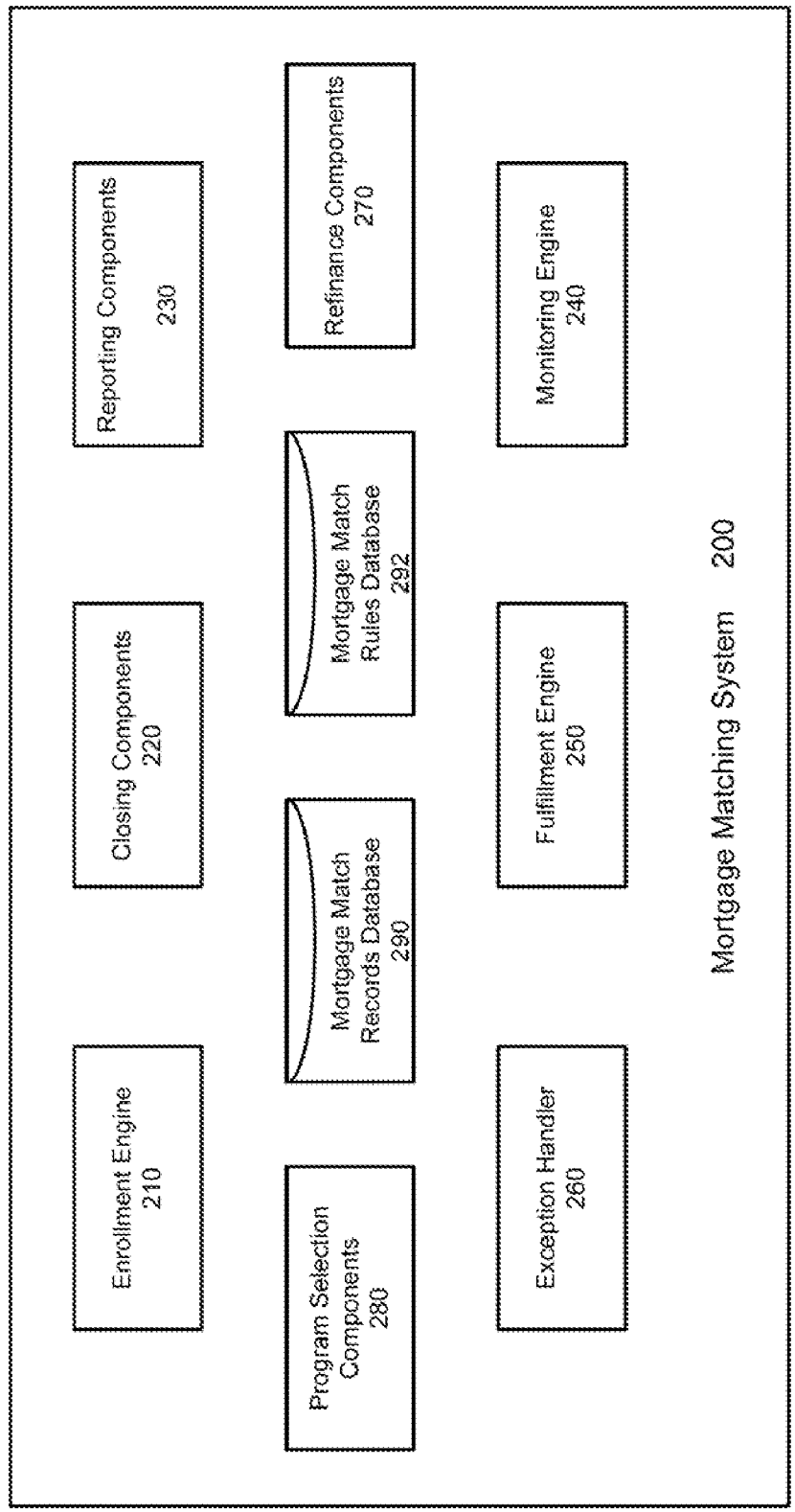
FIG. 2 is a block diagram illustrating components of a mortgage matching system in accordance with an embodiment of the invention.

FIG. 2 is a block diagram illustrating components of a mortgage matching system 200 in accordance with an embodiment of the invention. The mortgage matching system 200 may include an enrollment engine 210, closing components 220, reporting components 230, monitoring engine 240, fulfillment engine 250, exception handler 260, refinance components 270, and program selection components 280. These components may include software and/or hardware. Software components are implemented by one or more financial institution processors in order to execute the methods described herein.

The mortgage matching system 200 may additionally include databases such as a mortgage match records database 290 and a mortgage match rules database 292. As will be further described below, these databases 290 and 292 are accessible to the other components of the system so that data and rules may be retrieved when needed as well as stored and revised when appropriate.

While the components of FIG. 2 are shown as discrete components, they may be provided or developed in various combinations of the illustrated components or alternatively, the displayed components may be divided into multiple components. Furthermore, the components of FIG. 2 may all be interconnected for processing. The components may, for example, be connected over one or more networks or may exist as software modules executed by one or more computer processors.

The enrollment engine 210 may be used to enroll eligible customers in the mortgage matching system. Enrollment may occur, for example, at a financial institution branch, over the telephone, or through a computing device. The enrollment engine 210 determines eligibility for customers obtaining a new mortgage. Predetermined eligibility conditions may, for example, require new enrollees in the mortgage matching system to be new mortgage customers of the financial institution and to hold or establish a checking account with the financial institution. The predetermined conditions may for example require new enrollees in the mortgage matching system to be new mortgage customers of the financial institution although in some instances, retroactive enrollment may be enabled. Program participants may be required to set up the checking account prior to closing on the mortgage or alternatively at least prior to making a first mortgage payment. The conditions may additionally require that the enrollees make mortgage payments directly from the checking account in order to participate in the mortgage matching program. Furthermore, in embodiments of the invention, customers may be required to set up ACH auto-payment from the checking account to the mortgage account.

If the enrollment engine 210 determines that customers are eligible for enrollment and approves the application for enrollment, the system may generate a unique electronic coupon code that will be accessible to be utilized through enrollment, closing, and participation in the program for account identification purposes. Additionally, the enrollment components may create a file of enrolled customers for storage, such as in the mortgage match records database 290.

The closing components 220 operate to close on the mortgage. The closing components 220 in the mortgage matching environment may require that pre-conditions be met prior to closing on the loan. In embodiments of the invention, the opening of a checking account at the financial institution by the mortgage customer is required prior to proceeding on closing the eligible loan.

The reporting components 230 may operate through various phases of the mortgage matching system 200. For example, the closing components 230 may operate to welcome a new customer after closing of a loan, send informational materials, and forward periodic statements, such as monthly, quarterly, or yearly statements. The reporting components 230 may generate the required communications and may deliver them electronically or schedule them to be delivered by manual methods. Thus, reporting components 230 of the mortgage matching system 200 keep participants informed regarding compliance issues, earned rewards that will be paid by the financial institution, and rewards that have already been paid by the financial institution. In one preferred embodiment, the rewards are paid in order to reduce outstanding principal and the reports indicate the principal reduction.

After enrollment, the mortgage matching system 200 activates monitoring engine 240 to ensure continued compliance with the predetermined conditions prior to allowing a reward to be distributed. The monitoring engine 240 confirms continued compliance with eligibility requirements and pre-conditions. For example, the monitoring engine 240 may validate continued existence of a checking account and the continued use of the checking account to make periodic mortgage payments. In embodiments of the invention in which automatic payment is required, the monitoring engine 240 may periodically confirm the customer's selection of automatic ACH payments. Upon verifying compliance, the first reward payment may, for example be made after one full year of payments have been by the program participant. If non-compliance or partial non-compliance is detected, the program may be interrupted or terminated. Thus, any disruption in compliance, such as termination of automatic mortgage payments, termination of the checking account or more than one late payment throughout the program, may nullify the customer's participation in the mortgage matching system and no reward will then be generated.

Once compliance has been verified, the fulfillment engine 250 may implement reward determination/calculation components to calculate an accrued reward. The fulfillment engine 250 may further be implemented in order to transfer the accrued reward to the mortgage account or to another pre-selected location, as will be further explained below. Verification of the active checking account will occur prior to issuance of the annual reward.

The fulfillment engine 250 determines the reward payment to be transferred to complying customers and may include funds transfer components for transferring the calculated rewards to the customer mortgage account. In embodiments of the invention, the fulfillment engine 250 may also transfer the calculated reward to an alternative location of the customer's choosing. The calculated reward is due from the financial institution to the customer and does not merely redistribute the customer's own financial resources. In embodiments of the invention, operation of the fulfillment engine 250 is triggered after twelve months of customer participation in the mortgage matching program. Other time periods may also be utilized and are considered to be within the scope of the invention.

In embodiments of the invention, —the fulfillment engine 250 calculates one (1) % of one month's scheduled monthly principal and interest (P&I) payment of the new mortgage and totals over a twelve (12) month period. The 1% principal reduction calculation will typically apply to scheduled principal and interest payments only. The calculated amount would typically not apply to additional principal payments made by the borrower or to payments for escrowed items such as taxes and insurance. In one preferred embodiment in which the calculated reward is applied to principal reduction, the principal reduction in the first and last years of the mortgage period may be based on the number of monthly payments in that year. All other anniversary principal reductions may be calculated and totaled over the prior 12 month period. The sum may be applied to the outstanding principal balance each year on or about the anniversary date of the loan origination. In embodiments of the invention, a cap may be placed on the reduction of principal. For example, an annual cap, such as a $500 annual cap may be placed on the reduction of principal.

In other embodiments of the invention, the fulfillment engine 250 may calculate a reward based on an ARM. Thus, each time the ARM adjusts, the total monthly P&I payment will also adjust. The fulfillment engine 250 may calculate this adjustment based on a new balance that incorporates the earned rewards.

In additional embodiments of the invention, a customer may have multiple mortgage accounts or a home equity account in addition to a mortgage account. In this instance, an embodiment of the invention allows selection of one account for earning rewards. However the fulfillment engine 250 may apply a higher percentage of the P&I payment for the rewards. For example, rewards may be equal to 1.5% of the P&I payment for the selected mortgage.

Furthermore, as set forth above, an annual can may be placed on reduction of principal. However, this annual cap may vary based on the type of account linked to the mortgage matching system or the average monthly or yearly balance maintained in the account. For example, the system may be linked to a regular checking account, an investment account, a premier account, or a platinum account. The type of account may be determinative of the yearly rewards cap.

The exception handler 260 may be triggered upon detection of non-compliance by the monitoring engine 240. The exception handler 260 may also be triggered by other components of the system as necessary. For example the exception handler 260 may handle problems resulting from the enrollment process such as lost or misplaced coupon codes, ACH payment setup problems and delays, etc. The exception handler 260 may void enrollment if a payment has been missed or delayed. The exception handler 260 may be configured to void enrollment based on a single missed payment, multiple missed payments, or one or more late payments. Alternatively, the exception handler 260 may take other actions, such as prompting action from the reporting components 230 to issue warnings or other communications.

In embodiments of the invention, if the exception handler 260 detects any disruption in enrollment of automatic mortgage payments, the checking account or more than one late payment throughout the program, enrollment will be nullified. Further, the exception handler 260 may refer the account to servicing to assess a late payment fee if a payment received thirty (30) days or any other set number of days after the payment due date.

Refinance components 270 may operate to determine benefits in the event that an enrolled customer obtains a mortgage refinance. The refinance components 270 determine whether the customer is eligible to continue with the program and the amount of reward or benefit that will be transferred to the customer.

The program selection components 280 may be implemented in embodiments of the invention to provide a user interface with selectable options for the destination of the calculated reward. For example, while the reward may be utilized to pre-pay the customer's mortgage, embodiments of the invention may also allow a user to select an alternative destination for the reward, such as a checking account, a savings account, a home equity account, a credit account, or an investment account. Embodiments of the invention may also allow the user to transfer the reward to a credit card rewards program. This option may be implemented, for instance, when the user holds a credit card from the financial institution and the credit card implements a rewards feature. The rewards may also be transferred to an overall rewards program, such that all rewards from the financial institution are combined, and may be implemented by the user in any manner allowed by the financial institution. In addition to selecting payment of debts or credit card rewards, a plan participant could also donate the rewards to a charitable or non-profit organization.

The mortgage match records database 290 may include information related to enrolled customers and enrolled customer accounts. Furthermore, during the course of customer enrollment, payment data, rewards data, and any additional data required for utilization by the mortgage matching system 200 may be stored in and retrieved from the records database 290.

The mortgage match rules database 292 may be provided to store rules such as eligibility rules accessible to the enrollment engine 210 and compliance rules accessible to the monitoring engine 240. The rules database 292 may further store rewards calculation rules accessible to the fulfillment engine 250 and any other rules required for processing by the remaining components of the mortgage matching system 200.

Figure 3:
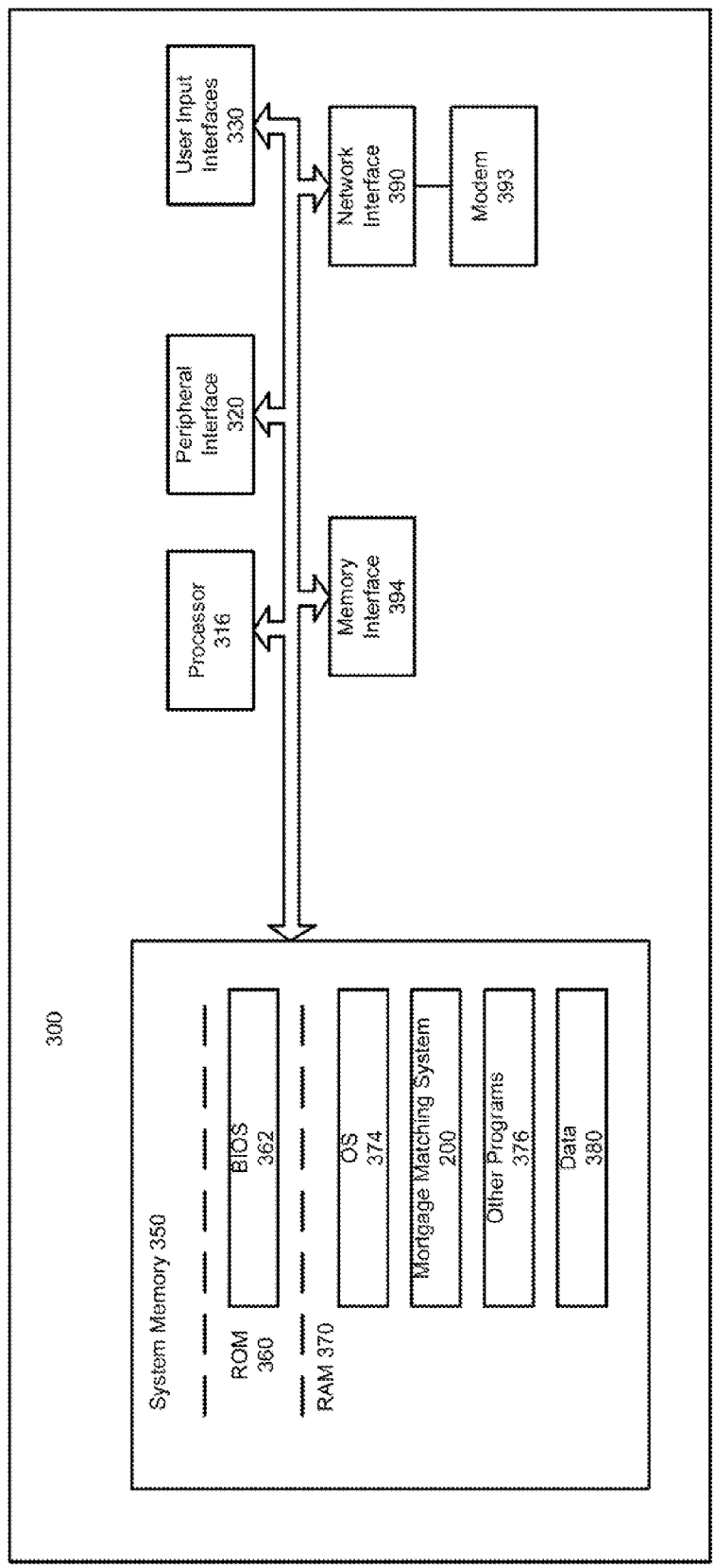
FIG. 3 is a block diagram illustrating a computer system implementing a mortgage matching system in accordance with an embodiment of the invention.

FIG. 3 is a block diagram illustrating a computing system 300 implementing a mortgage matching system in accordance with an embodiment of the invention. This configuration is merely exemplary and should not be construed as limiting. It is likely that multiple computing systems or devices will be utilized to implement the method and system in accordance with embodiments of the invention. The computing system 300 may include a processing unit 310, a peripheral interface 320, a user input interface 330, a system bus 340, a system memory 350, a network interface 390, a connected modem 392, and a memory interface 394. The system bus 340 may be provided for coupling the various system components. In embodiments of the invention, certain components, such as modem 392, need not be included.

Computers typically include a variety of computer readable media that can form part of the system memory and be read by the processing unit. By way of example, and not limitation, computer readable media may comprise computer storage media and communication media. The system memory 350 may include computer storage media in the form of volatile and/or nonvolatile memory such as read only memory (ROM) 360 and random access memory (RAM) 370.

A basic input/output system (BIOS) 362, containing the basic routines that help to transfer information between elements, such as during start-up, is typically stored in ROM 360. RAM 370 typically contains data and/or program modules that are immediately accessible to and/or presently being operated on by processing unit. The data or program modules may include an operating system 374, mortgage matching system 200, other program modules 376, and program data 380. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh™® operating system, the Apache™ operating system, an OpenStep™ operating system or another operating system of platform.

At a minimum, the memory 350 includes at least one set of instructions that is either permanently or temporarily stored. The processor 310 executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component, mechanism, or tool. The mortgage matching system 200 may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer. Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, REXX, and/or JavaScript for example. In embodiments of the invention, Ab Initio™ software is implemented and structured query language (SQL) is implemented for coding.

Further, it is not necessary that a single type of instruction or programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/nonremovable, volatile/nonvolatile computer storage media. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing unit 310 that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processor and/or memory may be composed of different physical pieces of equipment.

A user may enter commands and information into the computer through a user interface 330 that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface 320. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention. These networks may include any of those described above with reference to FIG. 1. Although many other internal components of the computer are not shown, those of ordinary skill in the art will appreciate that such components and the interconnections are well known. Accordingly, additional details concerning the internal construction of the computer need not be disclosed in connection with the present invention.

Those skilled in the art will appreciate that the invention may be practiced with various computer system configurations, including hand-held wireless devices such as mobile phones or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

Although the aforementioned components are shown as discrete modules, each of the modules may alternatively be integrated with one another. If the modules are discrete, multiple modules may operate cooperatively as will be further explained below.

Figure 4:
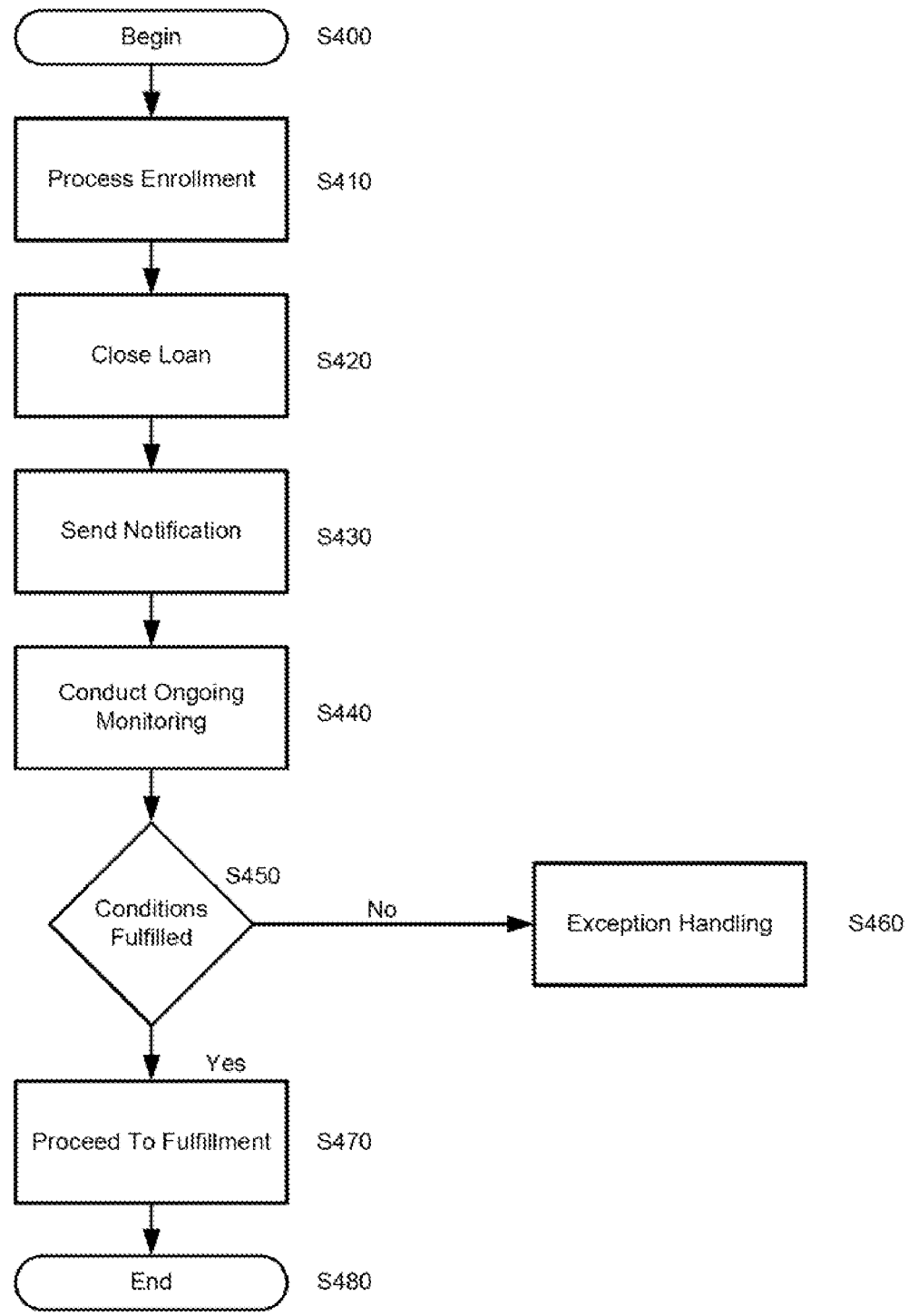
FIG. 4 is a flow chart illustrating a mortgage matching process in accordance with an embodiment of the invention.

FIG. 4 is a flow chart illustrating a computing system implementing a mortgage matching system in accordance with an embodiment of the invention. The method begins in S400 and in S410, the enrollment engine of the mortgage matching system processes enrollment of a customer in the mortgage matching system. In S420, the closing components close the mortgage loan for the enrolled customer. In 5430, reporting components may operate to forward notification of the successful enrollment to the customer. In S440, the mortgage matching system conducts ongoing monitoring to ensure compliance with rules and/or pre-conditions of the mortgage matching system. If all conditions checked are fulfilled in S450, the mortgage matching system proceeds to S470 for operation of the fulfillment engine, which calculates and transfers the reward to the mortgage customer. If the conditions are not fulfilled in S450, the exception handler operates in S460 to determine appropriate next steps. In embodiments of the invention, the exception handler may operate simultaneously with other system components and/or periodically throughout a customer's enrollment in order to detect and handle exceptions.

Figure 5:
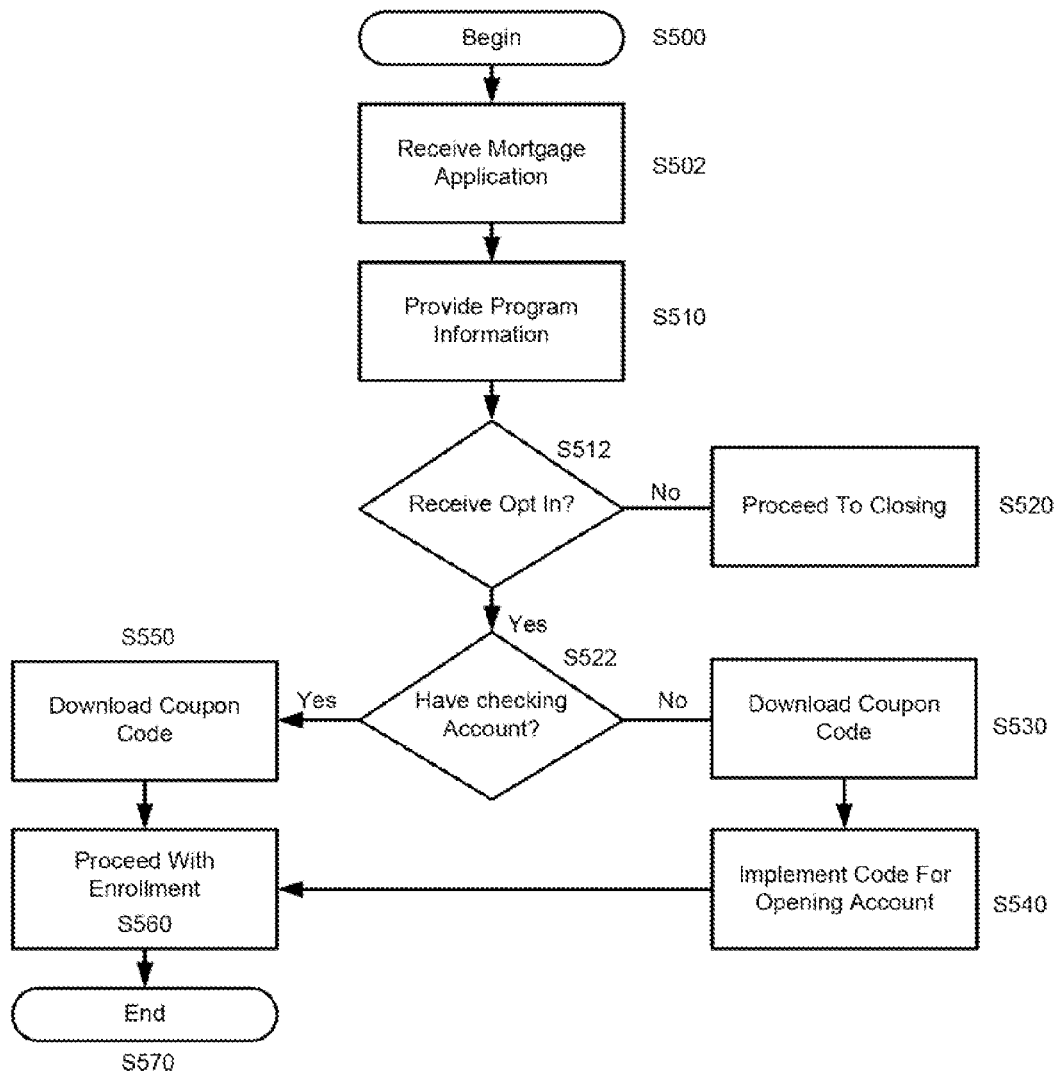
FIG. 5 is a flow chart illustrating an enrollment method of the mortgage matching system in accordance with an embodiment of the invention.

FIG. 5 is a flow chart illustrating an enrollment method performed by the mortgage matching system in accordance with an embodiment of the invention. The method begins in S500 and the enrollment engine receives the mortgage application in S502. In S510, the enrollment engine provides program information to the mortgage customer. If the enrollment engine receives no indication that the customer wants to opt in at S512, the mortgage proceeds to closing in the usual manner in S520. However, if the enrollment engine receives an indication that the customer wants to opt into the mortgage matching system in S512, the enrollment engine then proceeds to determine whether the customer holds a checking account with the financial institution in S522. In embodiments of the invention, if the customer does not hold a checking account in S522, the enrollment engine downloads an electronic coupon code in S530, which may be usable in S540 in order to open a checking account with the financial institution. If in S522, the enrollment engine determines that the customer has a checking account, the enrollment engine may cause downloading of a coupon code in S540 and thereafter proceed with enrollment in S560. The method ends in S570.

Figure 6:
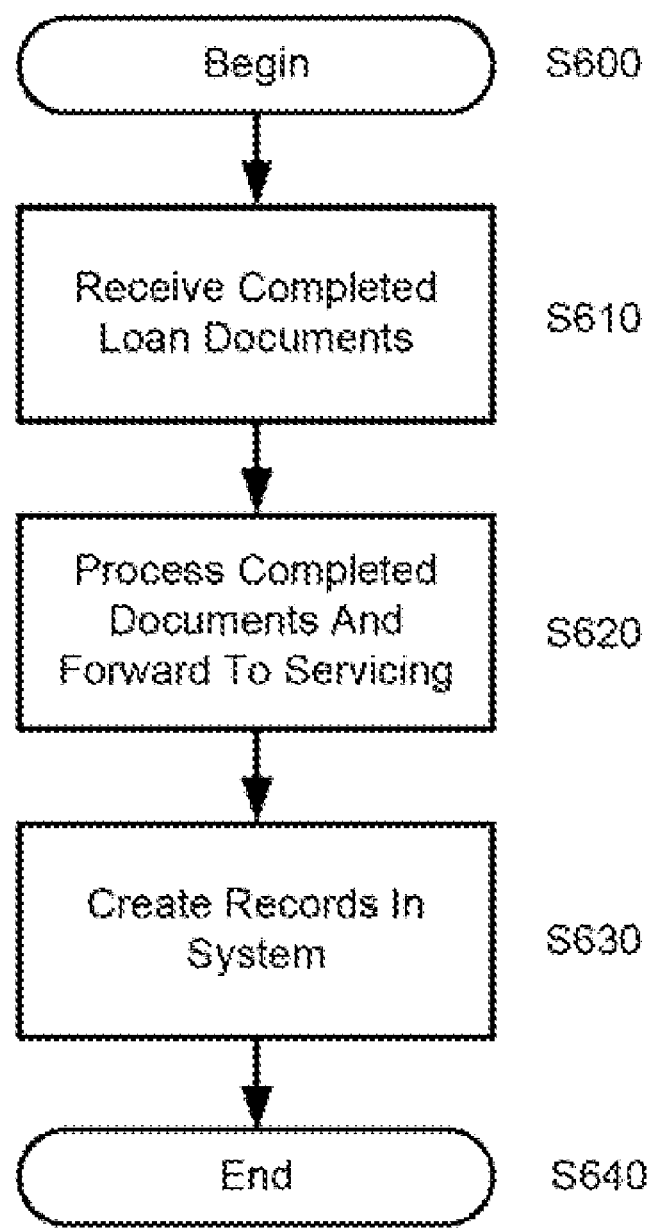
FIG. 6 is a flow chart illustrating a closing method of the mortgage matching system in accordance with an embodiment of the invention.

FIG. 6 is a flow chart illustrating a closing method in accordance with an embodiment of the invention. The method begins in S600 and the closing engine receives the completed loan documents in S610. In S620, the closing engine processes the completed documents and forwards them for servicing. The closing engine creates mortgage matching system records for the new loan in S630 and may store the records in the database 290. The method ends in S640.

Figure 7:
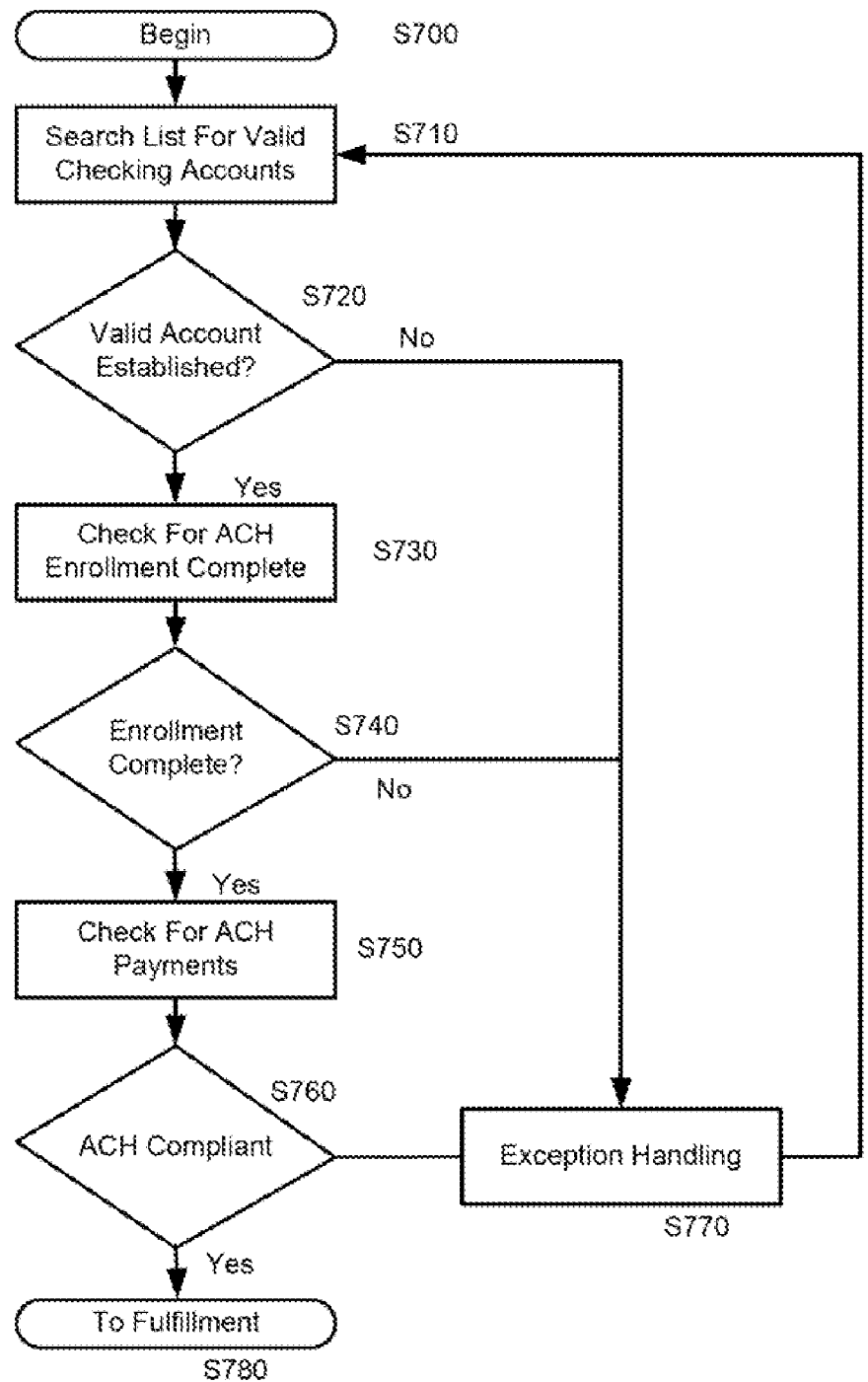
FIG. 7 is a flow chart illustrating a monitoring method of the mortgage matching system in accordance with an embodiment of the invention.

FIG. 7 is a flow chart illustrating a monitoring method in accordance with an embodiment of the invention. The method begins in S700 and the monitoring engine searches for valid checking accounts for enrolled customers in S710. If a valid checking account has not been established in S720, the monitoring engine refers the customer record to the exception handler in S770 for exception handling. If a valid checking account has been established in S720, the monitoring engine may check for ACH enrollment completion in S730 if the mortgage matching system requires this contingency. If enrollment has not been completed in S740, the monitoring engine refers the customer record to the exception handler in S770 for processing. If, however, in S740, enrollment has been completed, the monitoring engine may check for ACH payments in S750. If the customer has been ACH compliant in 760, the monitoring engine may refer the customer record to the fulfillment engine for fulfillment in S780. If the customer had not been ACH compliant in S760, the monitoring engine may refer the customer record to the exception handler for processing in S770.

Figure 8:
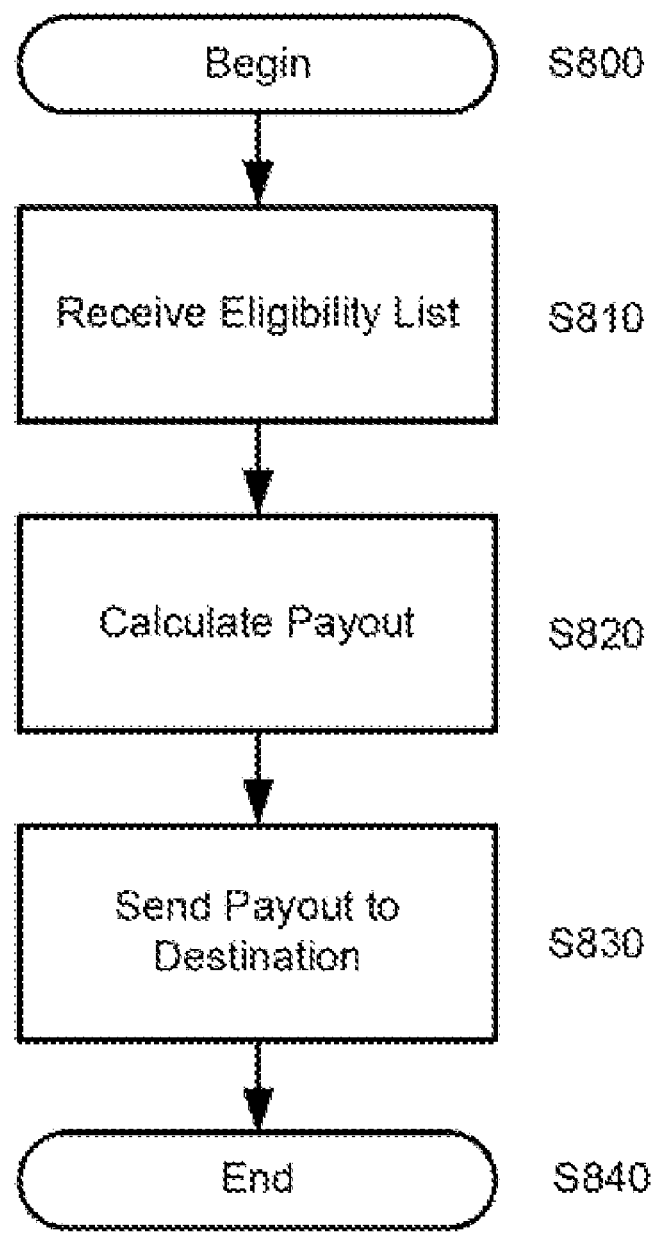
FIG. 8 is a flow chart illustrating a fulfillment method of the mortgage matching system in accordance with an embodiment of the invention.

FIG. 8 is a flow chart illustrating fulfillment in accordance with an embodiment of the invention. The method begins in S800 and the fulfillment engine receives an eligibility indication in S810. The eligibility indication may be in the form of an eligibility list for multiple eligible customers. In S820, the fulfillment engine calculates a payment account in accordance with stored rules. In S830, the fulfillment engine determines a destination for the calculated reward and the process ends in S840. In embodiments of the invention, once fulfillment has occurred, the system may send the participant a mobile alert or other notification of fulfillment.

Figure 9:
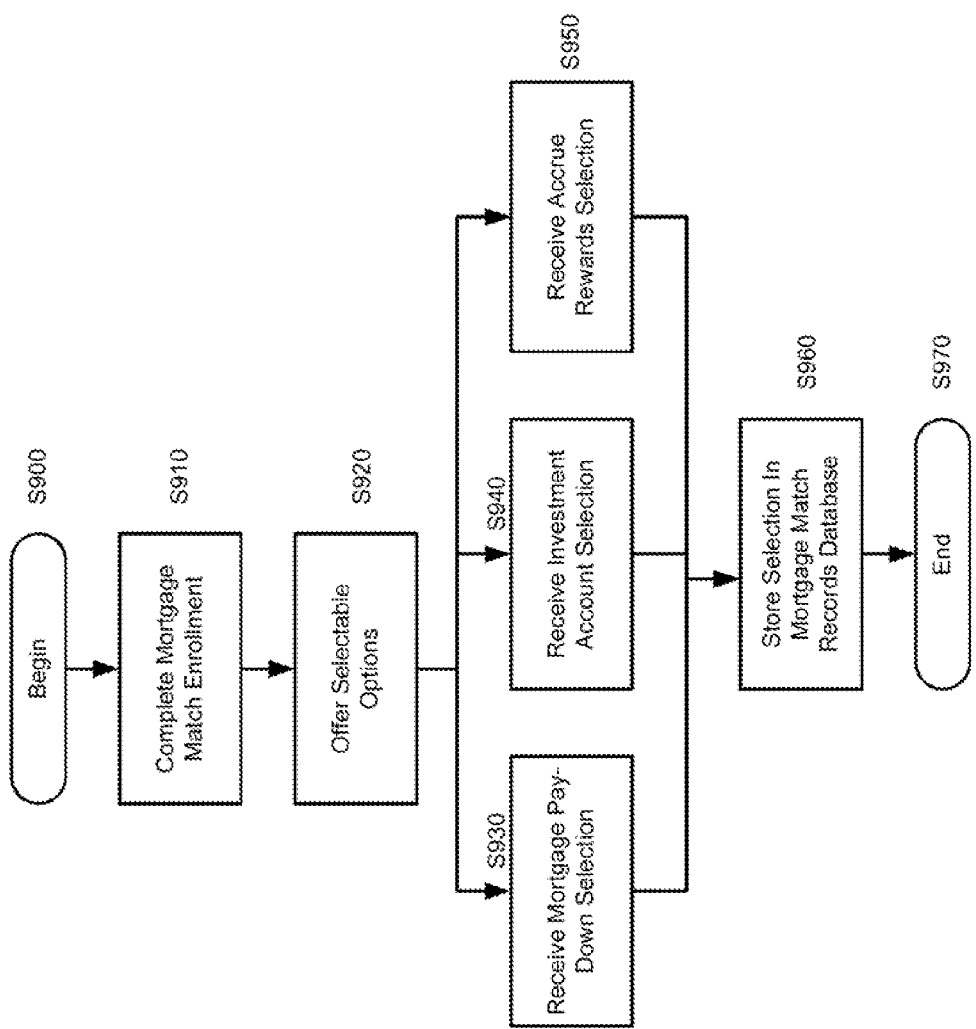
FIG. 9 is a flow chart illustrating a method for implementing selectable options in the mortgage matching system in accordance with an embodiment of the invention.

FIG. 9 is a flow chart illustrating a method for implementing selectable options in accordance with an embodiment of the invention. In embodiments of the invention, the mortgage payments made by the financial institution may constitute merely one selectable aspect of an overall rewards program managed by the financial institution. For example, the customer may choose to apply the rewards arising from the mortgage matching system participation to principal payment, but may alternatively choose to apply the calculated rewards to any other benefit offered by the financial institution, such as to payment of another loan, for example a home equity loan, or simply to an overall rewards program. In other embodiments, the mortgage matching system may be wholly separate from the overall rewards program offered by the financial institution.

As set forth above, in embodiments of the invention, eligible customers may be entitled to select a destination for mortgage matching funds. An embodiment of the method begins in S900 and the system completes mortgage match enrollment in S910. In S920, the system offers selectable options to the eligible customer. These selectable options may be offered for example through a user interface providing selectable checkboxes. In response to offering the selectable options, the mortgage matching system may receive a user selection as set forth in steps S930, S940, and S950. For example in S930, the system receives a mortgage pay down selection. In S940, the system receives an investment account selection. In S950, the system receives a selection to accrue rewards points. In S960, the selection is stored in a mortgage matching database for subsequent retrieval by the fulfillment engine. The method ends in S970.

The method illustrated in FIG. 9 is merely exemplary, as in some embodiments, the customer may not be permitted to make a destination choice. For example, in one embodiment, all funds accrued during the mortgage matching process will be directed to mortgage pre-payment. Additionally, the method illustrated in FIG. 9 is not exhaustive, and in some embodiments, the customer may be permitted to choose destinations not shown on FIG. 9, including, but not limited to, directing the reward to be transferred to an overall rewards program, such that all rewards from the financial institution are combined, selecting payment of debts or credit card rewards, or donating the rewards to a charitable or non-profit organization.

Figure 10:
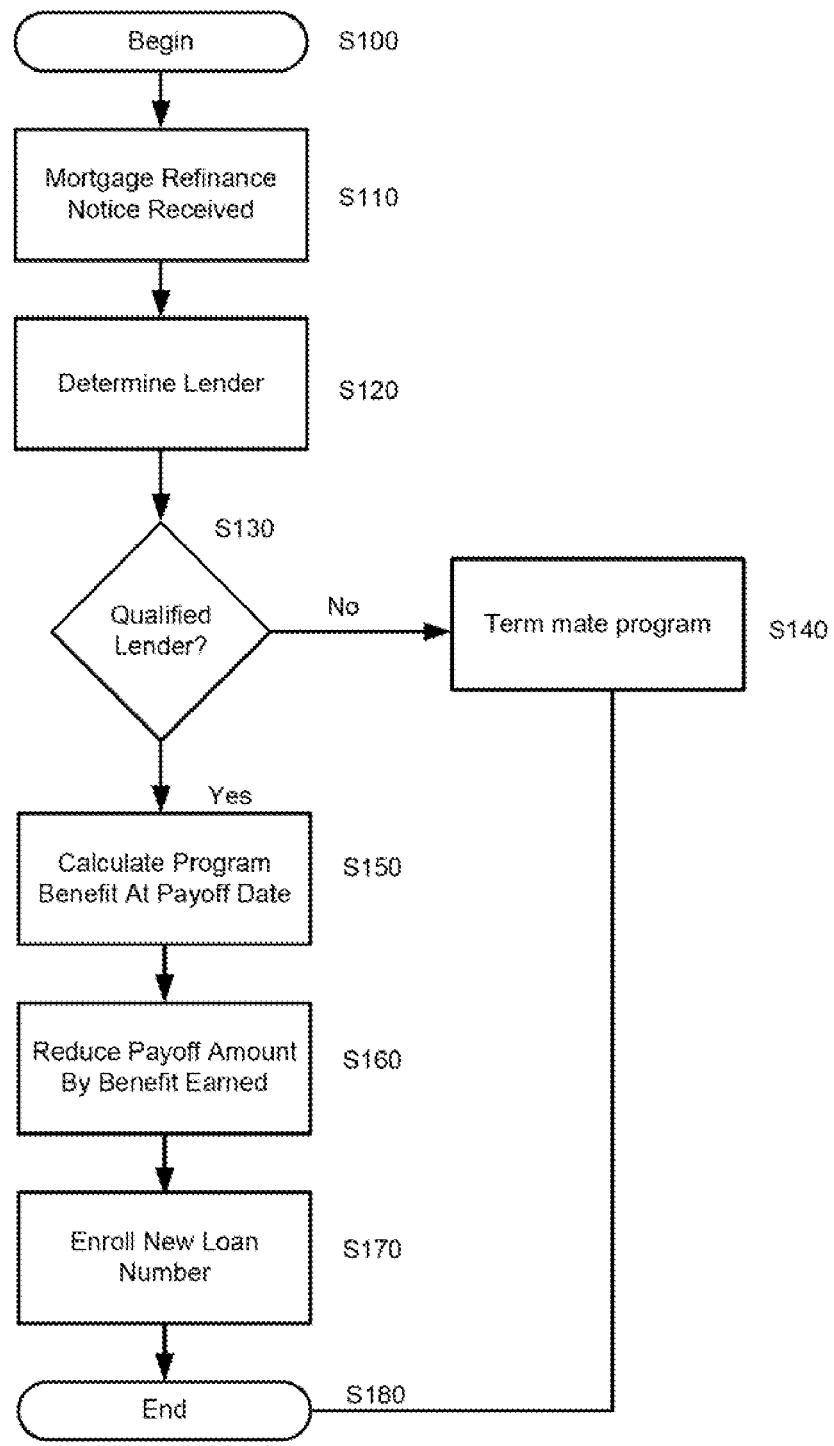
FIG. 10 is a flow chart illustrating operation of refinance components in the mortgage matching system in accordance with an embodiment of the invention.

FIG. 10 is a flow chart illustrating operation of refinance components in accordance with an embodiment of the invention. The method begins in S100 and a mortgage refinance notice is received in S110. In S120, the refinance components of the mortgage matching system determine the lender for the new mortgage loan. If the lender is not a qualified lender for the mortgage matching system in S130, the program will be terminated in S140. In embodiments of the invention, the lender must remain the same as the lender for the original mortgage in order for the refinance to remain a qualified mortgage. If the lender is a qualified lender in S130, the refinancing components calculate the program benefit to the participating customer at the payoff date of the previous mortgage. The refinance components then reduce the payoff amount by the benefit earned in S160 and enroll the new loan number in S170. The refinance process ends in S180.

Overall, the reward contribution from the financial institution enables early payment of the mortgages of enrolled customers and thus substantial interest savings for the enrolled customers. Embodiments of the invention may allow for payment of higher percentages based on the customer's deposited balance with the financial institution in order to target a premier segment of customers. Furthermore, customers who prefer other types of rewards may be able to earn these rewards simply through timely payment of mortgages.

While particular embodiments of the invention have been illustrated and described in detail herein, it should be understood that various changes and modifications might be made to the invention without departing from the scope and intent of the invention.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

The invention claimed is:

1. A computer-implemented method for rewarding mortgage customers of a financial institution with a reward payment amount, the method comprising:

providing enrollment in a mortgage matching system to eligible mortgage customers, wherein eligibility requirements include the requirement that eligible mortgage customers hold both a mortgage account and a checking account with the financial institution;

enabling the customers to make periodic mortgage payments from the checking account to the mortgage account;

monitoring continued compliance with the eligibility requirements and submission of the periodic payments using a monitoring engine implemented by at least one computer processor;

determining a reward payment amount to be made by the financial institution to each complying mortgage customer using a fulfillment engine implemented by the at least one computer processor, wherein the reward payment amount is a predetermined percentage of principal and interest paid by each complying mortgage customer during a predetermined time period; and transferring the calculated reward payment amount to a pre-selected location for each complying mortgage customer, wherein the pre-selected location is accessible to the corresponding complying mortgage customer.

2. The method of claim 1, further comprising enrolling the customer in an auto-payment system for making regular periodic mortgage payments.

3. The method of claim 1, wherein the pre-selected location is the customer mortgage account.

4. The method of claim 1, wherein determining the reward payment comprises calculating a pre-determined percentage of principal and interest paid by the customer into the mortgage account.

5. The method of claim 4, wherein the predetermined percentage is one percent and is calculated over a twelve month period.

6. The method of claim 1, further comprising providing each customer with multiple selectable locations for depositing the calculated reward payment, wherein one of the multiple selectable locations is the customer mortgage account.

7. The method of claim 1, further comprising terminating customer participation in the mortgage matching program upon detection of non-compliance.

8. The method of claim 1, further comprising preparing and sending periodic reports containing a paid reward amount to each customer.

9. The method of claim 1, further comprising processing a refinance application for at least one complying mortgage customer to provide a new mortgage loan for the complying mortgage customer.

10. The method of claim 9, further comprising calculating accrued rewards using a refinancing engine implementing a refinancing processor prior to closing on the refinance application.

11. The method of claim 10, further comprising reducing a payoff amount by the calculated accrued rewards and enrolling the new mortgage loan in the mortgage matching system.

12. A computer-implemented mortgage matching system for rewarding mortgage customers of a financial institution with a reward payment amount, the system comprising:

an enrollment engine for enrolling eligible mortgage customers in the mortgage matching system, wherein eligibility requirements include the requirement that eligible mortgage customers hold both a mortgage account and a checking account with the financial institution and make period payments from the checking account to the mortgage account;

a monitoring engine for monitoring continued compliance with the eligibility requirements and submission of the periodic payments, the monitoring engine implemented by at least one computer processor; and a fulfillment engine implemented by the at least one computer processor, the fulfillment engine comprising:

calculation components for determining a reward payment amount to be made by the financial institution to each complying mortgage customer, wherein the reward payment amount is a predetermined percentage of principal and interest paid by each complying mortgage customer during a predetermined time period; and reward transfer components for transferring the calculated reward payment amount to a pre-selected location for each complying mortgage customer, wherein the pre-selected location is accessible to the corresponding complying mortgage customer.

13. The system of claim 12, wherein the enrollment engine further enrolls the customer in an auto-payment system for making regular periodic mortgage payments.

14. The system of claim 12, wherein the pre-selected location is the customer mortgage account.

15. The system of claim 12, wherein the reward calculation components determine the reward payment by calculating a pre-determined percentage of principal and interest paid by the customer into the mortgage account.

16. The system of claim 15, wherein the predetermined percentage is one percent and is calculated over a twelve month period.

17. The system of claim 12, further comprising program selection components providing each customer with multiple selectable locations for depositing the calculated reward payment, wherein one of the multiple selectable locations is the customer mortgage account.

18. The system of claim 12, further comprising an exception handler for terminating customer participation in the mortgage matching program upon detection of non-compliance.

19. The system of claim 12, further comprising reporting components for preparing and sending periodic reports containing a paid reward amount to each customer.

20. The system of claim 12, further comprising refinance components for processing a refinance application for at least one complying mortgage customer to provide a new mortgage loan for the complying mortgage customer.

21. The system of claim 20, wherein the refinance components further calculate accrued rewards prior to closing on the refinance application.

22. The system of claim 21, wherein the refinance components further reduce a payoff amount by the calculated accrued rewards and approve enrollment of the new mortgage loan in the mortgage matching system.

23. A computer-implemented method for rewarding mortgage customers of a financial institution with a reward payment amount, the method comprising:

providing enrollment in a mortgage matching system to eligible mortgage customers, wherein eligibility requirements include the requirement that eligible mortgage customers hold both a mortgage account and a checking account with the financial institution;

enabling the customer to automatically make periodic mortgage payments from the checking account to the mortgage account;

monitoring continued compliance with the eligibility requirements and automatic submission of the periodic payments using a monitoring engine implemented by at least one computer processor;

determining a reward payment amount to be made by the financial institution to each complying mortgage customer using a fulfillment engine implemented by the at least one computer processor, wherein the reward payment amount is a predetermined percentage of principal and interest paid by each complying mortgage customer through the auto-payment system during a predetermined time period; and transferring the calculated reward payment amount to the mortgage account for each complying mortgage customer;

processing a refinance application for at least one complying mortgage customer to provide a new mortgage loan for the complying mortgage customer; and calculating accrued rewards using a refinancing engine implementing a refinancing processor prior to closing on the refinance application.

24. The method of claim 23, further comprising enrolling the customer in an auto-payment system for making regular periodic mortgage payments.

25. The method of claim 23, wherein determining the reward payment comprises calculating a pre-determined percentage of principal and interest paid by the customer into the mortgage account.

26. The method of claim 25, wherein the predetermined percentage is one percent and is calculated over a twelve month period.

27. The method of claim 23, further comprising providing each customer with multiple selectable locations for depositing the calculated reward payment, wherein one of the multiple selectable locations is the customer mortgage account.

28. The method of claim 23, further comprising terminating customer participation in the mortgage matching program upon detection of non-compliance.

29. The method of claim 23, further comprising preparing and sending periodic reports containing a paid reward amount to each customer.

30. The method of claim 23, further comprising reducing a payoff amount by the calculated accrued rewards or depositing the accrued reward in an eligible account.

31. The method of claim 23, further comprising enrolling the new mortgage loan in the mortgage matching system.

\* \* \* \* \*